(12) United States Patent
Karino et al.

(10) Patent No.: US 6,590,776 B2
(45) Date of Patent: Jul. 8, 2003

(54) SENSOR DEVICE

(75) Inventors: Kazuya Karino, Miyazaki (JP); Kazuo Yuhi, Miyazaki (JP); Tsuyoshi Tsuboi, Miyazaki (JP)

(73) Assignee: Honda Lock Mfg. Co., Ltd., Miyazaki (JP)

( * ) Notice: Subject to any disclaimer, the term of this patent is extended or adjusted under 35 U.S.C. 154(b) by 0 days.

(21) Appl. No.: 10/147,929

(22) Filed: May 20, 2002

(65) Prior Publication Data

US 2002/0181207 A1 Dec. 5, 2002

(30) Foreign Application Priority Data

Jun. 1, 2001 (JP) ......................................... 2001-167109

(51) Int. Cl.[7] .............................. H05K 7/00; H05K 7/10
(52) U.S. Cl. ....................................... 361/728; 361/730
(58) Field of Search ................................. 361/728, 729, 361/730, 731, 715; 174/50; 439/55

(56) References Cited

U.S. PATENT DOCUMENTS

| | | | | |
|---|---|---|---|---|
| 5,231,758 A | * | 8/1993 | Schauer | 29/856 |
| 5,483,157 A | * | 1/1996 | Nakatake et al. | 324/174 |
| 5,575,681 A | * | 11/1996 | Muzslay et al. | 439/681 |
| 5,926,085 A | * | 7/1999 | Abe et al. | 338/160 |
| 6,155,114 A | * | 12/2000 | Karino et al. | 73/493 |

FOREIGN PATENT DOCUMENTS

JP    A 2000-206130    7/2000

* cited by examiner

*Primary Examiner*—David Martin
*Assistant Examiner*—Dameon E. Levi
(74) *Attorney, Agent, or Firm*—Liniak, Berenato & White

(57) ABSTRACT

In a sensor device in which an IC module having a sensing portion at its top end is housed and fixed in a housing made of a synthetic resin, and a pair of leads are connected at one end of them to the IC module in the housing, the sensor device including a holder assembly comprising a first holder having a containment recess for containing the IC module while retaining the top end of the IC module, and an insert hole leading to the containment recess for allowing the IC module to be inserted to the containment recess, and a second holder having a partition wall disposed between the pair of leads connected to the rear end of the IC module, inserted in the insert hole of the first holder, and retaining the rear part of the IC module in cooperation with the first holder, the IC module being contained in the containment recess and the holder assembly being covered by the housing, whereby it is possible to simplify the structure of assembling the second holder to the first holder, and simplify the operation of assembling the IC module to the holder assembly, thereby enabling to easily manufacture the sensor device.

2 Claims, 6 Drawing Sheets

SENSOR DEVICE

BACKGROUND OF THE INVENTION

1. Field of the Invention

This invention relates to a sensor device in which an IC module having a sensing portion at its top end is housed and fixed in a housing formed of a synthetic resin, and a pair of leads are connected at one end of them to the IC module in the housing.

2. Detailed Art Statement

The sensor device of the type described above has been already been known in, for example, Japanese Patent Laid-Open No. 2000-206130, in which an IC module is housed in a recess of a holder and a lid covering the containment recess in a state where the IC module is contained in the holder, and the holder and the lid are housed by a housing.

However, in the existent device described above, operation of attaching the lid to the holder to close the recess in the state where the IC module is contained in the recess is troublesome, and the structure for attaching the lid to the holder is also complicate.

OBJECT AND SUMMARY OF THE INVENTION

This invention has been achieved in view of the situations, and it intends to provide a sensor device which can facilitate the assembling operation of the IC module, and which has a simplified structure for fixing and assembling the IC module.

For attaining the foregoing object, this invention provides a sensor device in which an IC module having a sensing portion at its top end is housed and fixed in a housing formed of a synthetic resin, and a pair of leads are connected at one end of them to the IC module in the housing, the sensor device including a holder assembly comprising;
  a first holder having a containment recess for containing the IC module while retaining the top end of the IC module, and an insert hole leading to the containment recess for allowing the IC module to be inserted to the containment recess, and
  a second holder having a partition wall to be disposed between the pair of leads connected to the rear end of the IC module, inserted in the insert hole of the first holder, and retaining the rear part of the IC module in cooperation with the first holder,
the IC module in a state contained in the containment recess and the holder assembly being enclosed in the housing.

In accordance with the constitution described above, the holder assembly can be assembled by inserting the IC module connected at the rear end thereof with the pair of leads and the second holder having the partition wall being put between both of the leads through the insert hole into the first holder, thereby retaining the top end of the IC module contained in the containment recess by the first holder and retaining the rear part of the IC module by the first holder and the second holder that is inserted into the insert hole while preventing the pair of leads from being in contact with each other. This can facilitate the operation of assembling the IC module to the holder assembly, as well as simplify the structure of assembling the second holder to the first holder. Further, since the IC module in the state contained in the containment recess and the holder assembly are enclosed in the housing, this can facilitate manufacture of the sensor device in which the IC module is housed and fixed in the housing with the sensing portion being located to the top end of the housing and the pair of leads are connected at one end of them with the IC module in the housing.

Further, in a preferred embodiment of the invention having the constitution described above, protrusions that are melt upon contact with a molten resin charged in a molding apparatus for forming the housing are formed to the first holder made of a synthetic resin so as to surround the opening end of the containment recess and the rear opening end of the insert hole over the entire periphery thereof, respectively, and the positioning abutments in direct contact with the molds of the molding apparatus are disposed to the surface of the first holder at positions for putting the protrusions between the opening end of the containment recess and the rear opening end of the insert hole so as to position and fix the holder assembly in the molding apparatus.

With the constitution of this preferred embodiment, even when water should intrude to the joined faces between the first holder and the housing, since the periphery at the opening end of the containment recess and the rear opening end of the insert hole are in an intimate contact with the housing by the molten protrusions of the first holder, intrusion of water toward the IC module in the containment recess can be reliably prevented.

DETAILED DESCRIPTION OF THE DRAWINGS

A preferred embodiment of this invention will be described with reference to the accompanying drawings, wherein FIG. 1 is a cross sectional view of a sensor device;

DESCRIPTION OF PREFERRED EMBODIMENTS

FIG. 1 to FIG. 6 illustrate a preferred embodiment of this invention applied to a vehicle wheel speed sensor.

Figure 1:
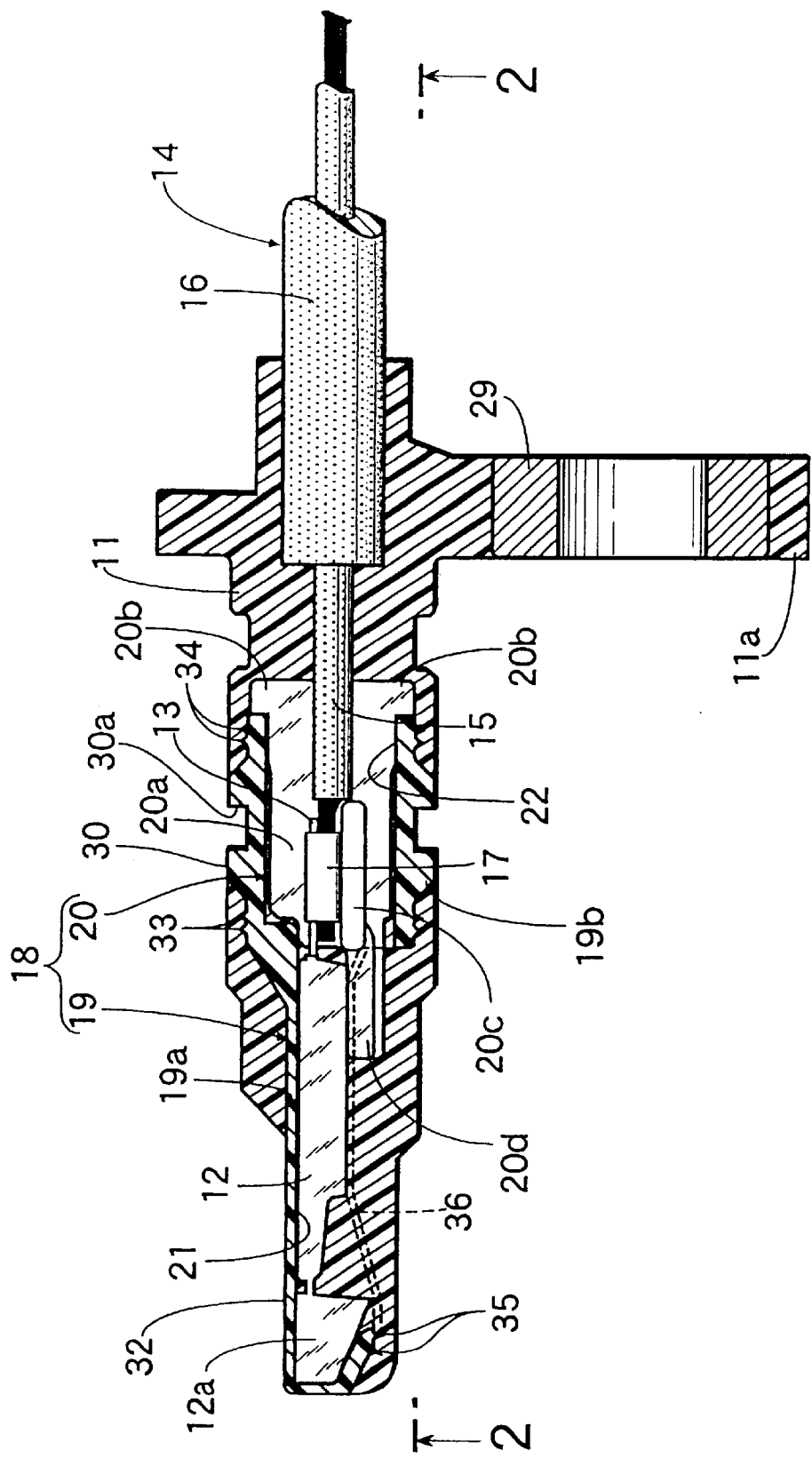
Figure 2:
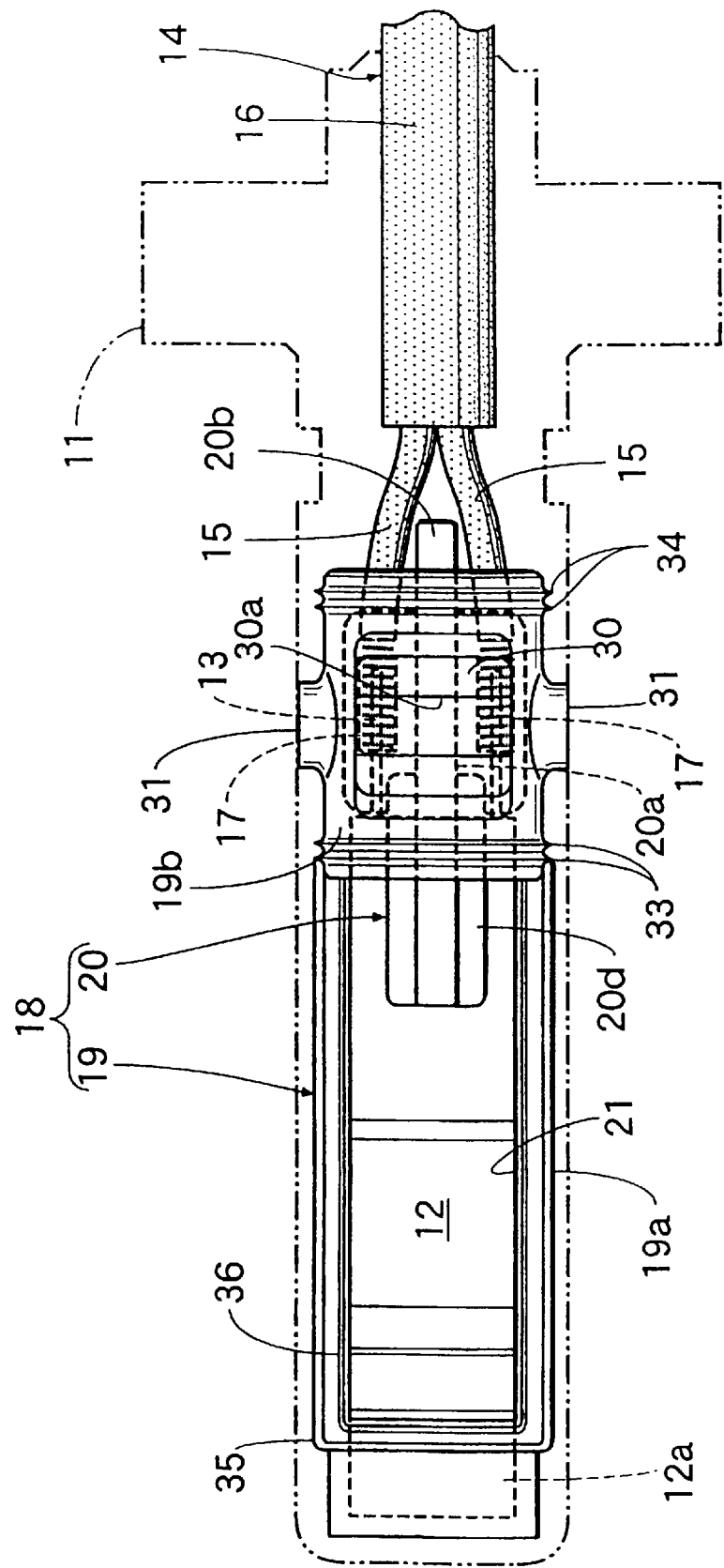
FIG. 2 is a view taken-along line 2—2 shown in FIG. 1 in a state where a housing is removed.

First, in FIG. 1 and FIG. 2, this sensor device is utilized, for example, as a wheel speed sensor for a vehicle. An IC module 12 is housed and fixed in a housing 11 that is fixed on a stationary support (not shown). A cord 14 connected to the IC module 12 is extended out of the housing 11.

The IC module 12 has a sensing portion 12a incorporating a magnet and an IC hole element at its top end, and a pair of terminals 13, 13 at its rear end. They are housed and fixed in the housing 11 so as to situate the sensing portion 12a at the top end in the housing 11, and situate the pair of terminals 13, 13 at the rear end.

The cord 14 comprises a pair of bundled leads 15 and 15 being covered with an insulative cover 16. Extensions of respective leads 15 and 15 from one end of the insulative cover 16 are connected to the paired terminals, for example, by welding or clamping using a joint member 17 made of a conductive metal.

The IC module 12, and a portion of the paired leads 15 and 15 connected with the IC module 12 are contained in a holder assembly 18 comprising a first holder 19 and a second holder 20 attached to the first holder. The holder assembly 18 contains the IC module 12 and a part of the leads 15 and 15 and the assembly 18 is substantially enclosed in the housing 11.

Figure 3:
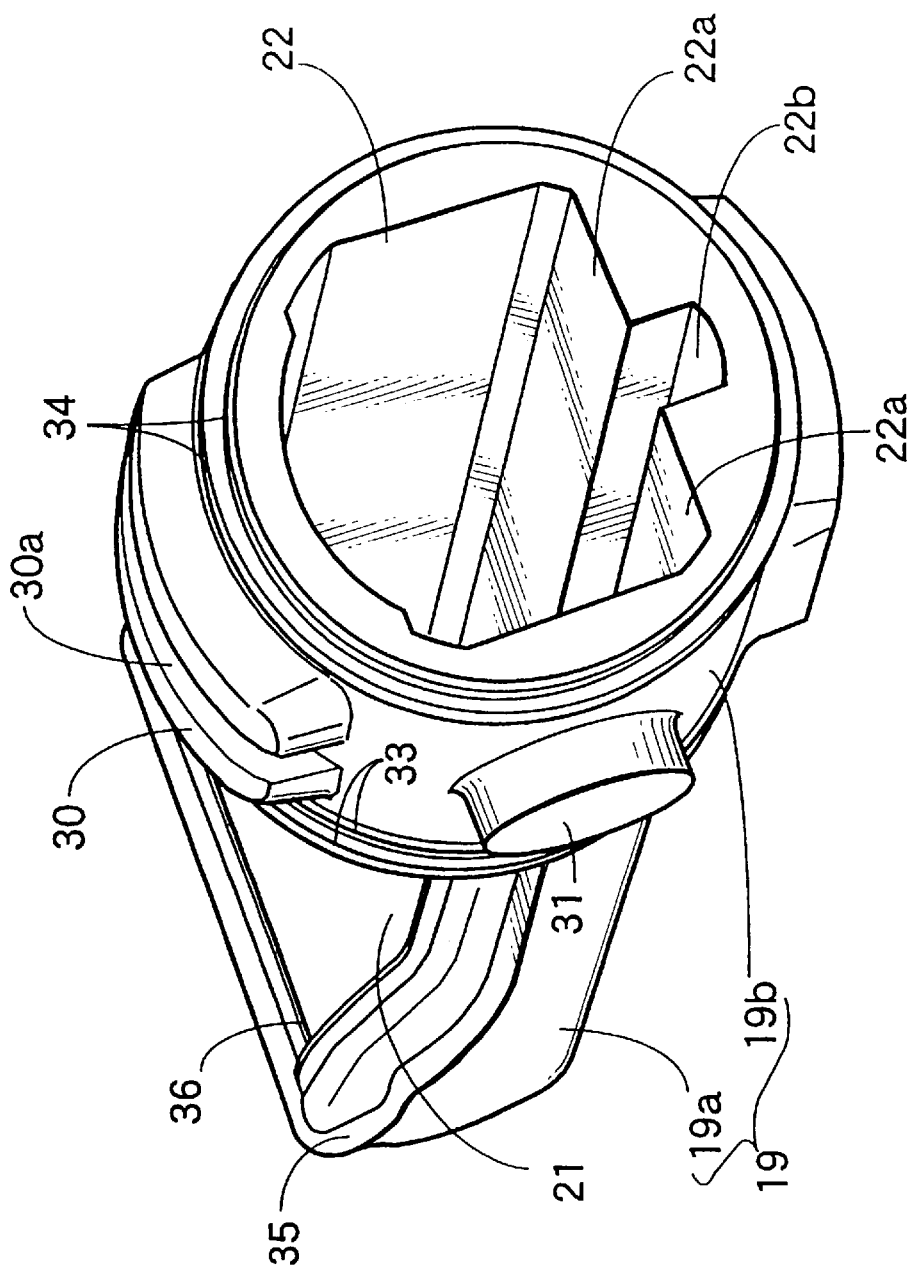
FIG. 3 is a perspective view of a first holder as viewed from a rear end.

Referring also to FIG. 3, the first holder 19 has a holder main part 19a extending linearly and a retaining part 19b joined integrally with the rear end of the holder main part 19a, and they are made of a synthetic resin. The holder main part 19a has a containment recess 21, and a main portion of the recess, except for the top end, is opened on one side of the holder main part 19a for containing the IC module 12. The top end of the containment recess 21 is formed as a blind hole to engage and retain the top end, that is, a sensing portion 12a of the IC module 12 in the state of containing the IC module 12 in the containment recess 21. That is, the IC module 12 is contained in the containment recess 21 so that its top end, that is, the sensing portion 12a is retained by the top end of the holder main part 19a.

The retaining part 19b is formed cylindrically to define an insert hole 22 leading to the rear end of the containment recess 21. The IC module 12 is inserted from the insert hole 22 to the containment recess 21. The insert hole 22 has a non-circular shape including, as an internal part thereof, a pair of flat surfaces 22a and 22a leading to and in flush with the inner end face of the containment recess 21, and a slot 22b put between the flat surfaces 22a and 22a.

Figure 4:
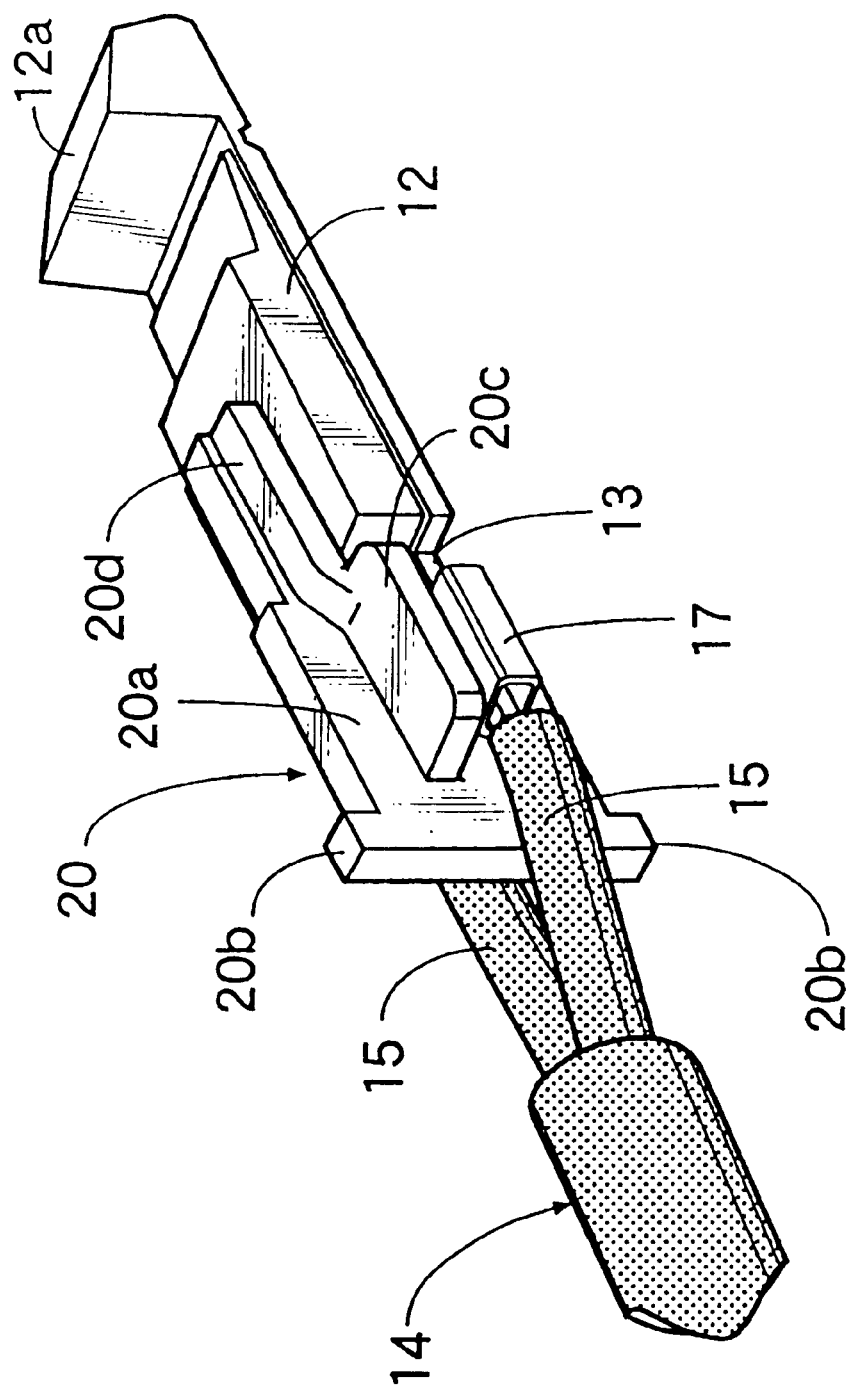
FIG. 4 is a perspective view showing a state of joining a second holder to an IC module and leads.

Referring to FIG. 4, the second holder 20 has a flat partition wall 20a, retaining protrusions 20b and 20b, collars 20c and 20c, and a retaining plate 20d, which are integrally formed of a synthetic resin. The partition wall 20a is placed between the pair of leads 15a and 15a connected to the rear end of the IC module 12. The retaining protrusions 20b and 20b project upward and the downward at the rear end of the partition wall 20a so as to abut against the rear end face of the first holder 19, that is, against the rear end face of the retaining part 19a when the partition wall 20a is inserted into the insert hole 22 being guided along the slot 22b of the insert hole 22. The collars 20c and 20c project each at a right angle from both lateral sides of the partition wall so as to sandwich the leads 15 and 15 on both sides of the partition wall 20a between the collars and the flat surfaces 22a and 22a, and define passages 23 and 23 (shown FIG. 5) to the inside of the insert hole 22 on both sides of the partition wall 20a, to flow a molten resin upon forming the housing 11. The retaining plate 20d projects forwardly from the front ends of the partition wall 20a and of the collars 20c and 20c so as to engage the rear end of the IC module 12.

Figure 5:
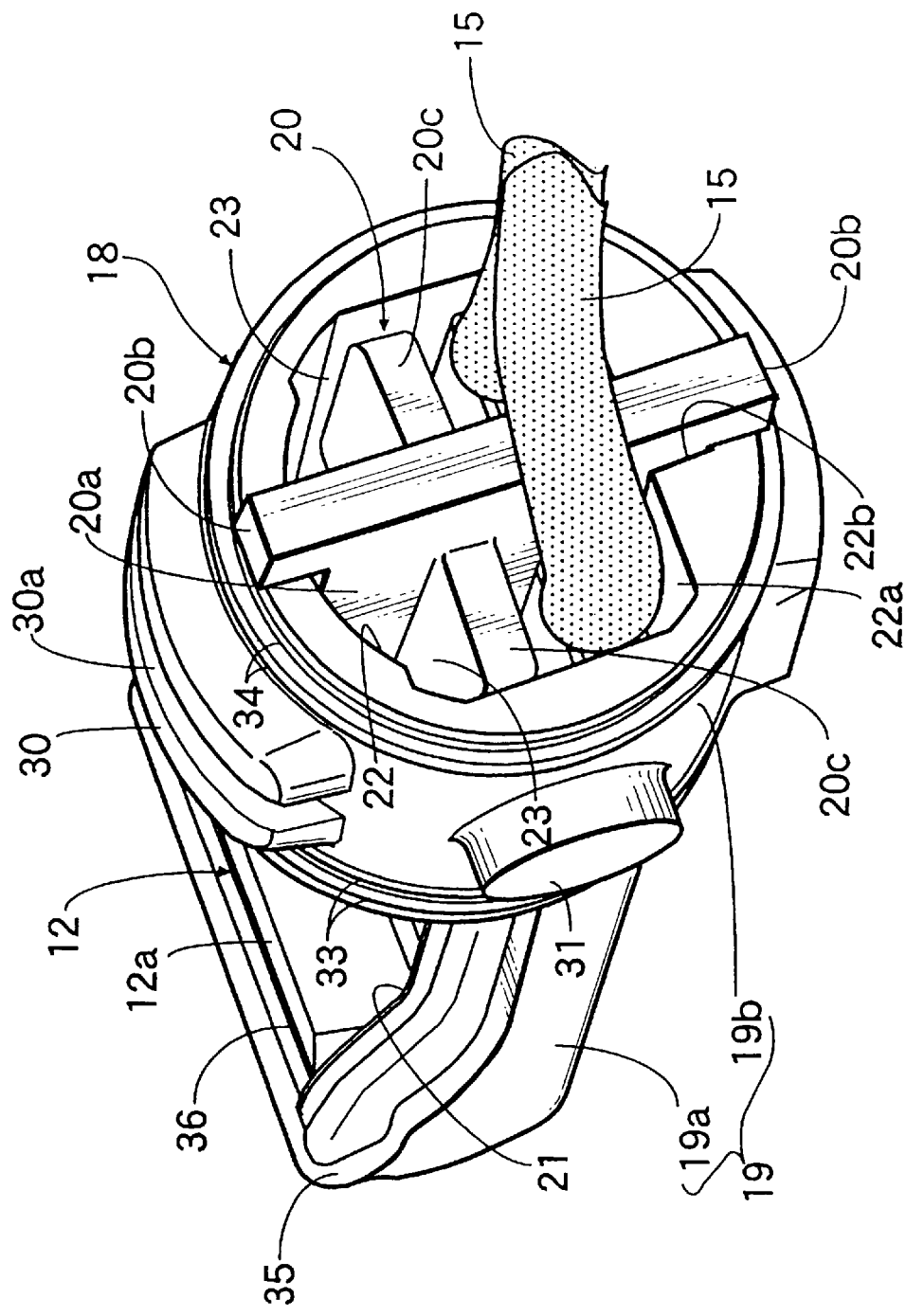
FIG. 5 is a perspective view showing a state of assembling an IC module, leads and a second holder to a first holder.

Thus, as shown in FIG. 5, when the IC module 12 with the rear end being connected to the pair of leads 15 and 15, and the second holder 20 with the partition wall 20a being present between both of the leads 15 and 15 are inserted from the insert hole 20 into the first holder 19, it is possible to assemble the holder assembly 18 while retaining the top end of the IC module 12 contained in the containment recess 21 by the first holder 19, and retaining the rear end of the IC module 12 by the first holder 19 and the retaining plate 20d of the second holder 20 inserted into the insert hole 22 while preventing the pair of the leads 15 and 15 from contacting to each other.

Figure 6:
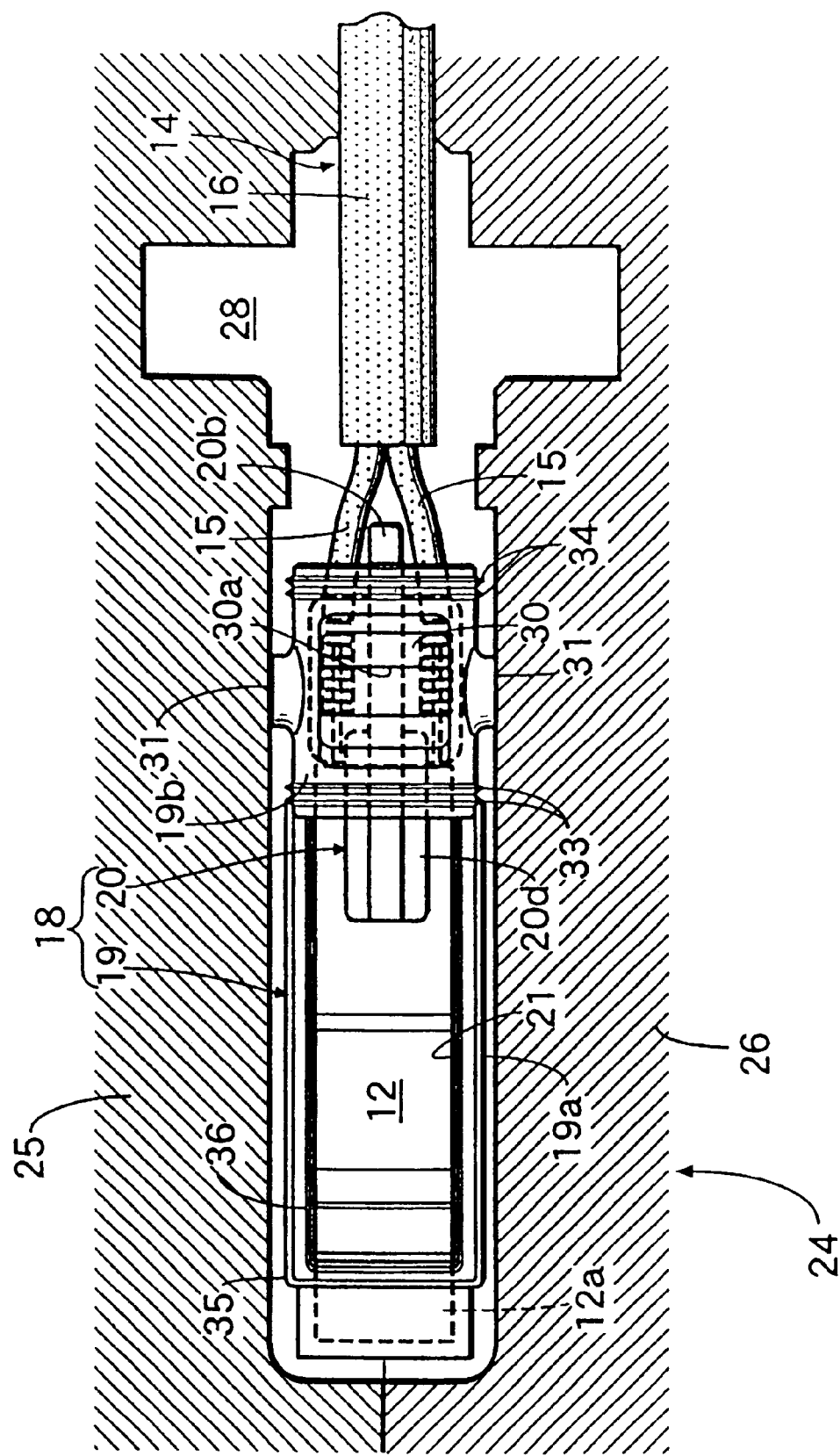
FIG. 6 is a cross-sectional view of a molding apparatus for forming a housing.

The IC module 12 and the holder assembly 18 are placed in a molding apparatus 24 shown in FIG. 6. The molding apparatus 24 comprises, for example, molds 25 and 26, in which a cavity 28 corresponding to the outer shape of the housing 11 is formed between the molds 25 and 26 in which the IC module 12 and the holder assembly 18 are clamped, and the IC module 12 and the holder assembly 18.

By the way, as shown in FIG. 1, the housing 11 has a bracket 11a formed integrally therewith and externally extending sideways. A metal collar 29 is integrally buried in the bracket 11a for inserting a bolt to tighten the housing 11 to a support (not shown). A sliding mold (not shown) to be inserted to the collar 29 is slidably disposed to one of the molds 25 and 26 in the molding apparatus 24.

In order to position and fix the holder assembly 18 within the molding apparatus 24, the retaining part 19b in the first holder 19 has, at its external surface, a pair of first positioning abutments 30 and 30 formed at both ends of one diametrical line of the retaining part 19b, and a pair of second positioning abutments 31 and 31 formed at both ends of another diametrical line which is in perpendicular to the first mentioned diametrical line. The holder main part 19a of the first holder 19 has, at its front end, a third positioning abutment 32 (shown in FIG. 1).

The first positioning abutments 30 and 30 project from the outer surface of the retaining part 19b so as to be in direct contact with the internal surface near the parting lines of the molds 25 and 26 in the molding apparatus 24. Engaging slots 30a and 30a are formed to the first abutments 30 and 30 for engagement with protrusions formed on the molds 25 and 26. Further, the second abutments 31 and 31 project from the outer surface of the retaining part 19b so as to be in direct contact with the internal surfaces of the molds 25 and 26 in the molding apparatus 24. Further, the third positioning abutment 32 is formed flat so as to be in direct contact with the internal surface near the parting lines of the molds 25 and 26 in the molding apparatus 24.

A pair of ring-like protrusions 33 and 33 project on the entire periphery of the outer surface of the retaining part 19b ahead each pair of the first and the second positioning abutments 30 and 30; and 31 and 31, and a pair of ring-like protrusions 34 and 34 project on the entire periphery of the outer surface of the retaining part 19b behind each pair of the first and the second positioning abutments 30 and 30; and 31 and 31. That is, the protrusions 33 and 33 are formed to the retaining part 19b so as to be situated between the opening end of the containment recess 21 and the first and the second positioning abutments 30 and 30; and 31 and 31, and the protrusions 34 and 34 are formed to the retaining part 19b so as to be situated between the rear opening end of the insert hole 22, and the first and the second positioning abutments 30 and 30; and 31 and 31, while surrounding the entire periphery of the rear opening end of the insert hole 22.

Further, protrusions 35 and 36 that surround the opening end of the containment recess 21 in cooperation with the protrusions 33 and 33 of the retaining part 19b are formed to the holder main part 19a of the first holder 19 so as to situate between the opening end of the containment recess 21 and the third positioning abutment 32.

The protrusions 33 and 33; 34 and 34; 35 and 36 are melted in contact with the molten resin charged in the cavity 28 within the molding apparatus 24, and each of the protrusion is formed in a trigonal cross-section as to project, for example, by about 0.3 mm.

Referring to the operation and the function of this embodiment, the holder assembly 18 comprises the first holder 19 and the second holder 20, in which the first holder has the containment recess 21 for containing the IC module 12 while retaining the top end of the IC module 12 and the insert hole 22 leading to the containment recess 21 while allowing the IC module 12 to be inserted in the containment recess 21, and the second holder 20 has the partition wall 20a being positioned between the pair of the leads 15 and 15, is inserted into the insert hole 22 of the first holder 19 and retains the rear part of the IC module 12 in cooperation with the first holder 19.

Accordingly, it is possible to assemble the holder assembly 18 by inserting the IC module 12 being connected with the leads 15 and 15 and the second holder 20 into the first holder 19 from the insert hole 22, thereby retaining the top end of the IC module 12 contained in the containment recess 21 by the first holder 19, and retaining the rear part of the IC module 12 by the second holder 20 and the first holder 19. Thus, it is possible to simplify the structure of assembling the holder 20 to the first holder 19, and to simplify the operation of assembling the IC module 12 to the holder assembly 18.

In addition, since the housing 11 encloses the IC module 12 which is contained in the containment recess 21 and the holder assembly 18, this can facilitate manufacture of the sensor device in which the IC module 12 is housed and fixed within the housing 11 so as to position the sensing portion 12a at the top end of the housing 11 and the pair of leads 15 and 15 are connected at one end thereof to the IC module 12 in the housing 11.

In addition, the first holder 19 formed of the synthetic resin is provided, around its surface, with the protrusions 33–36 that are melted upon contact with the molten resin during molding of the housing 11 so that they surround the entire periphery of the opening end of the containment recess 21 and the rear opening end of the insert hole 22 respectively, as well as provided with the first to third positioning abutments 30 and 30; 31 and 31; and 32 in direct contact with the molds 25 and 26 in the molding apparatus 24 at positions so as to put the protrusions 33–36 between the opening end of the containment recess 21 and the rear opening end of the insert hole 22 in order to position and fix the holder assembly 18 in the molding apparatus 24.

Accordingly, even when water unintentionally intrudes to joined faces between the first holder 19 and the housing 11, since the periphery of the opening end of the containment recess 21 and the rear opening end of the insert hole 22 are in intimate contact with the housing 11 by each of molten protrusions 35 to 36, it is possible to surely prevent penetration of water toward the IC module 12 within the containment recess 21.

While this invention has been described specifically referring to the embodiment, the invention is not restricted to the embodiment mentioned above, but various design changes may be adopted without departing from the gist of the invention described above.

As described above, in accordance with this invention, it is possible to simplify the structure of assembling the second holder to the first holder, and simplify the operation of assembling the IC module to the holder assembly, thereby enabling to easily manufacture the sensor device.

In addition, in accordance with the preferred embodiment of the invention, even when water unintentionally intrudes to the joined faces of the first holder and the housing, it is possible to reliably prevent intrusion of water toward the IC module in the containment recess.

What is claimed is:

1. A sensor device in which an IC module having a sensing portion at its top end is housed and fixed in a housing formed of a synthetic resin, and a pair of leads are connected at one end to the IC module in the housing, the sensor device including a holder assembly comprising a first holder and a second holder inserted into and combined with the first holder;

the first holder having a containment recess for containing the IC module while retaining the top end of the IC module, and an insert hole leading to the containment recess for allowing the IC module to be inserted to the containment recess, and the second holder being inserted in the insert hole of the first holder, said second holder having a retaining portion for retaining the rear portion of the IC module in cooperation with the first holder and having a partition wall disposed between the pair of leads connected to the rear end of the IC module for isolating the leads from each other, the holder assembly being enclosed, in the state of containing the IC module, in the containment recess in the housing by the synthetic resin covering the surface of the holder assembly.

2. A sensor device as defined in claim 1, wherein the first holder made of synthetic resin comprises:

protrusions formed to the opening end of the containment recess and the opening end at a rear portion of the insert hole over the entire periphery thereof, respectively, and positioning abutments formed on the surface of the first holder between the opening end of the containment recess and the opening end at a rear portion of the insert hole at positions for putting the protrusions between them and the opening end of the containment recess and the opening end at the rear portion of the insertion hole, the protrusions capable of being melted together with a molten synthetic resin used for molding of the housing, and the positioning abutments being in direct contact with the surface of the molds.

* * * * *